United States Patent
Augier et al.

(10) Patent No.: US 10,464,035 B2
(45) Date of Patent: Nov. 5, 2019

(54) MIXING DEVICE SITUATED ABOVE THE DISTRIBUTION ZONE

(71) Applicant: IFP Energies Nouvelles, Rueil-Malmaison (FR)

(72) Inventors: Frederic Augier, Rueil-Malmaison (FR); Philippe Beard, Rueil-Malmaison (FR); Cecile Plais, Rueil-Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 16/293,730

(22) Filed: Mar. 6, 2019

(65) Prior Publication Data
US 2019/0275487 A1    Sep. 12, 2019

(30) Foreign Application Priority Data

Mar. 7, 2018   (FR) ...................... 18 51949

(51) Int. Cl.
*B01J 8/00*   (2006.01)
*B01J 8/02*   (2006.01)
(Continued)

(52) U.S. Cl.
CPC .......... *B01J 8/0438* (2013.01); *B01J 8/0492* (2013.01); *C10G 45/02* (2013.01); *C10G 45/32* (2013.01);
(Continued)

(58) Field of Classification Search
CPC ......... B01J 8/00; B01J 8/02; B01J 8/04; B01J 8/0403; B01J 8/0423; B01J 8/0438; B01J 8/0492; B01J 2208/00796; B01J 2208/00823; B01J 2208/00831; B01J 2208/00893; B01J 2208/00902;
(Continued)

(56) References Cited

U.S. PATENT DOCUMENTS 9,764,299 B2    9/2017   Beard et al.
2016/0288073 A1   10/2016   Beard et al.

FOREIGN PATENT DOCUMENTS

FR        3034323 A1    10/2016
WO   2014/210276 A1    12/2014

OTHER PUBLICATIONS

Search Report dated Aug. 29, 2018 issued in corresponding FR 1851949 application (2 pages).

*Primary Examiner* — Natasha E Young
(74) *Attorney, Agent, or Firm* — Millen, White, Zelano and Branigan, P.C.

(57) ABSTRACT

Device for mixing and distributing fluids for a downflow catalytic reactor, comprising:
  a collecting zone (A) comprising a collecting means (5);
  a substantially vertical collecting pipe and at least one injection means (8) opening into said collecting pipe;
  a mixing zone (B) comprising a fluid mixing chamber (15) of length L1, said mixing zone (15) comprising a first end in communication with said collecting pipe and a second end in communication with a fluid exchange chamber (16) of length L2, situated beneath said mixing chamber (15), the length L2 of said exchange chamber (16) being strictly greater than the length L1 of said mixing chamber (15);
  a distribution zone (C), situated beneath the mixing zone (B), comprising a distribution plate (12) that carries a plurality of chimneys (13), and a plurality of horizontal panels (33), situated above or on the chimneys (13).

15 Claims, 4 Drawing Sheets

(51) Int. Cl.
*B01J 8/04* (2006.01)
*C10G 45/02* (2006.01)
*C10G 45/32* (2006.01)
*C10G 45/44* (2006.01)
*C10G 47/00* (2006.01)

(52) U.S. Cl.
CPC .............. *C10G 45/44* (2013.01); *C10G 47/00* (2013.01); *B01J 2208/00831* (2013.01); *B01J 2208/00902* (2013.01); *B01J 2208/00938* (2013.01)

(58) Field of Classification Search
CPC ........... B01J 2208/00938; C10G 45/02; C10G 45/32; C10G 45/44; C10G 47/00
See application file for complete search history.

MIXING DEVICE SITUATED ABOVE THE DISTRIBUTION ZONE

This application claims priority to France Patent Application Serial No. FR 1,851,949, filed on Mar. 7, 2018.

TECHNICAL FIELD

The present invention lies in the field of exothermic reactions and relates more particularly to hydrotreating, hydrodesulfurization, hydrodenitrogenation, hydrocracking, hydrogenation, hydrodeoxygenation, hydroisomerization, hydrodewaxing or hydrodearomatization reactions carried out in a fixed bed reactor. The invention relates more particularly to a device for mixing and distributing fluids in a cocurrent downflow reactor and the use thereof for carrying out exothermic reactions.

PRIOR ART

Exothermic reactions carried out for example in refinery and/or in petrochemistry need to be cooled by an additional fluid, referred to as quench fluid, in order to avoid thermal runaway of the catalytic reactor in which they are carried out. The catalytic reactors used for these reactions generally comprise at least one solid catalyst bed. The exothermic nature of the reactions makes it necessary to maintain a homogeneous axial temperature gradient over the reactor cross section, and a radial temperature gradient close to zero within the reactor so as to avoid the existence of hot spots in the catalyst bed contained in the reactor. Zones that are too hot can prematurely reduce the activity of the catalyst and/or lead to nonselective reactions and/or lead to thermal runaway. Therefore, it is important to have at least one mixing chamber in a reactor, said mixing chamber being situated between two catalyst beds, allowing a homogeneous temperature distribution in the fluids over a reactor cross section and cooling of the reaction fluids to a desired temperature.

In order to effect this homogenization, a person skilled in the art often has to use a specific arrangement of internals that are often complex, involving the introduction of quench fluid that is as homogeneous as possible into the cross section of the reactor. For example, the document FR 2 824 495 A1 describes a quenching device that makes it possible to ensure effective heat exchange between the quench fluid (s) and the fluid(s) of the process. This device is incorporated in a chamber and comprises a tube for injecting the quench fluid, a baffle for collecting the fluids, the quenching box itself, effecting the mixture between the quench fluid and the downwardly flowing reaction fluid, and a distribution system made up of a perforated dish and a distribution plate. The quenching box has a deflector for setting the fluids into swirling movement in a substantially nonradial direction not parallel to the axis of said chamber and downstream of the deflector, in the direction of flow of the reaction fluid, at least one outlet passage section for the mixture of fluids formed in the box. However, such a device has a number of drawbacks:

- the device does not prove sufficient in terms of effectiveness of mixing and distributing the fluids, in particular for high fluid flow rates (quench fluid and/or reaction fluid);
- the device is fairly bulky, and thus the space lost in a reactor using such a device has an impact on the quantity of catalyst that can be used.

It is an aim of the present invention to remedy the problems set out above by proposing a mixing and distribution device that allows better effectiveness of mixing of the fluids and thus allows better distribution of the fluids over the distribution plate, without otherwise losing compactness, or even with the latter being increased.

Subjects of the Invention

The subject of the present invention is a device for mixing and distributing fluids for a downflow catalytic reactor, said device comprising:

- at least one collecting zone comprising at least one collecting means;
- at least one substantially vertical collecting pipe that is able to receive a reaction fluid collected by said collecting means and at least one injection means opening into said collecting pipe in order to inject a quench fluid;
- at least one mixing zone, situated downstream of said collecting pipe in the direction of flow of the fluids, said mixing zone comprising at least one fluid mixing chamber of length L1, said mixing zone comprising a first end in communication with said collecting pipe and a second end in communication with a fluid exchange chamber of length L2, situated beneath said mixing chamber, the length L2 of said exchange chamber being strictly greater than the length L1 of said mixing chamber so as to create a ceiling on said exchange chamber, said ceiling comprising at least one opening that allows the fluids to pass from said exchange chamber to a distribution zone;
- at least one distribution zone, situated beneath the mixing zone, downstream of said mixing zone in the direction of flow of the fluids, said distribution zone comprising a distribution plate that carries a plurality of chimneys and a plurality of horizontal panels, situated beneath the opening in the ceiling of the exchange chamber but above the chimneys or on the chimneys of the distribution plate of the distribution zone.

Preferably, the ratio between the length L1 of the mixing chamber and the length L2 of the exchange chamber is between 0.1 and 0.9.

Advantageously, the percentage of surface area taken up by the opening(s) is between 20 and 100% relative to the total surface area of the ceiling.

In one particular embodiment, the percentage of surface area taken up by the opening(s) is equal to 100% of the total surface area of the ceiling.

In one embodiment according to the invention, said horizontal panels are situated at a height of at most 100 mm above the chimneys of the distribution plate.

In another embodiment according to the invention, said horizontal panels are situated on the chimneys of the distribution plate.

Advantageously, the surface area of the cross section taken up by said horizontal panels is in the range from 2 to 95% of the surface area of the cross section of the distribution zone (C).

Advantageously, said horizontal panels are spaced apart from one another by a distance of between 1 and 50 mm.

In one embodiment according to the invention, said mixing zone is off-center with respect to the central axis of the distribution zone, forming two zones (Z1) and (Z2) on the distribution plate, the ratio R of which defined as the relationship between the surface area of the zone (Z1) and the zone (Z2) is between 0 and 1, not including the values 0 and 1.

In one embodiment according to the invention, the mixing chamber comprises a bottom having an end edge that has a beveled shape and forms an angle α of between 20° and 70° with the longitudinal axis XX' of the mixing chamber.

In one embodiment according to the invention, the injection means is supplemented by a nozzle that opens directly into said collecting pipe, said nozzle consisting of a tube comprising at least one orifice that opens into said collecting pipe.

Advantageously, said exchange chamber also comprises, on its lateral walls, a plurality of lateral passage sections suitable for the passage of the fluids from said exchange chamber to said distribution zone.

Preferably, the device according to the invention also comprises at least one lateral deflector situated in said distribution zone opposite at least one lateral passage section. Advantageously, the volume ratio between said mixing chamber and said exchange chamber is between 5 and 60%.

Another subject of the invention relates to a downflow catalytic reactor having a chamber containing at least two fixed catalyst beds separated by an intermediate zone having a device for mixing and distributing fluids according to the invention.

DETAILED DESCRIPTION OF THE INVENTION

Definitions

Within the meaning of the invention, a mixing chamber is understood to be the space in which the mixture between a reaction fluid and a quench fluid is effected.

An exchange chamber is understood to be the space in which a mixed reaction fluid and quench fluid are in direct contact with a distribution zone for the fluids via at least one opening.

DETAILED DESCRIPTION

All the embodiments described below are part of the general disclosure of the invention and are combinable with one another.

The mixing and distribution device according to the invention is used in a reactor in which exothermic reactions such as hydrotreating, hydrodesulfurization, hydrodenitrogenation, hydrocracking, hydrogenation, hydrodeoxygenation, hydroisomerization, hydrodewaxing or hydrodearomatization reactions are carried out. Generally, the reactor has an elongate shape along a substantially vertical axis. At least one reaction fluid (also referred to as "process fluid") is made to flow from the top of said reactor to the bottom through at least one fixed catalyst bed. Advantageously, at the outlet of each bed apart from the last one, the reaction fluid is collected and then mixed with a quench fluid in said device before being distributed onto a catalyst bed situated downstream of a distribution plate. Downstream and upstream are defined with respect to the direction of flow of the reaction fluid. The reaction fluid may be a gas or a liquid or a mixture containing liquid and gas; this depends on the type of reaction carried out in the reactor.

Figure 1:
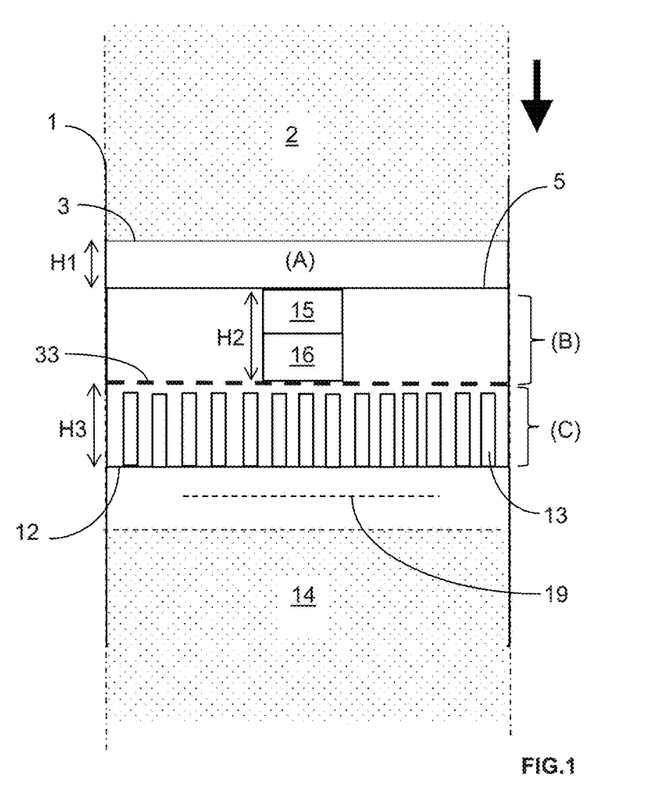
FIG. 1 shows an axial section through a downflow catalytic reactor comprising at least two beds of solid catalyst, and comprising a device for mixing and distributing fluids according to the invention.
Figure 2:
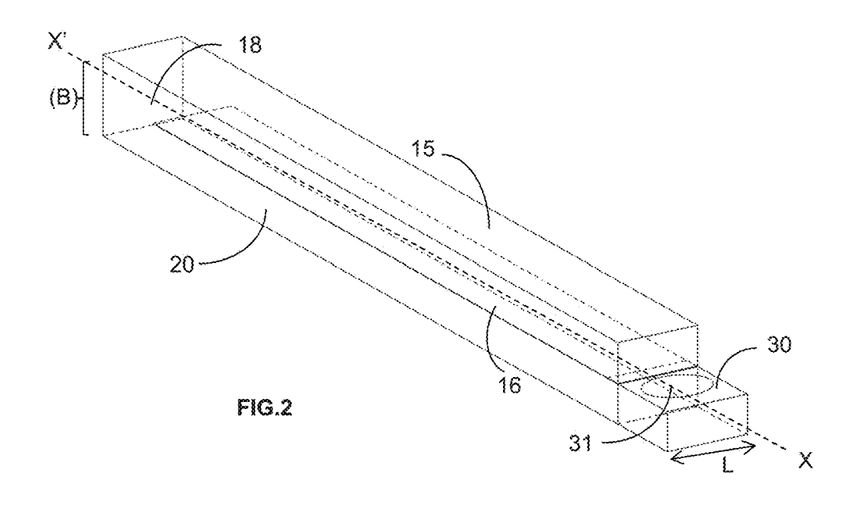
FIG. 2 is a perspective view of the mixing zone (B) of the device according to the invention.
Figure 3:
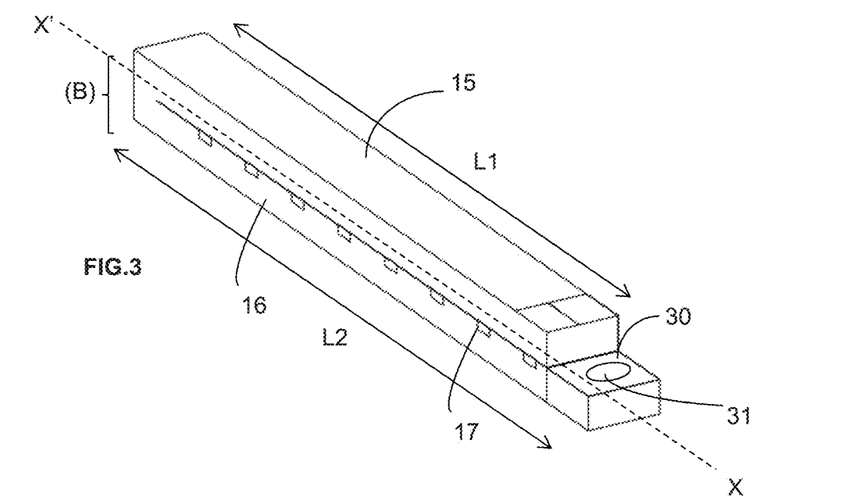
FIG. 3 shows a perspective view of the mixing zone (B) of the device according to the invention comprising lateral passage sections.

With reference to FIG. 1, the mixing and distribution device may be disposed in a reactor 1 of elongate shape along a substantially vertical axis in which at least one reaction fluid is made to flow from top to bottom through at least one catalyst bed 2. The device is disposed under the catalyst bed 2, relative to the direction of flow of the reaction fluid in the chamber 1. A support grating 3 makes it possible to support the catalyst bed 2 so as to free up a collecting zone (A) disposed under the catalyst bed 2. The collecting zone (A) is necessary to allow the reaction fluid to drain down to a collecting pipe 7 (cf. FIGS. 4 and 5). A quench fluid is injected into the collecting pipe 7 via an injection means 8 for the quench fluid (cf. FIGS. 4 and 5). The quench fluid may be liquid or gaseous or a mixture containing liquid or gas.

Figure 4:
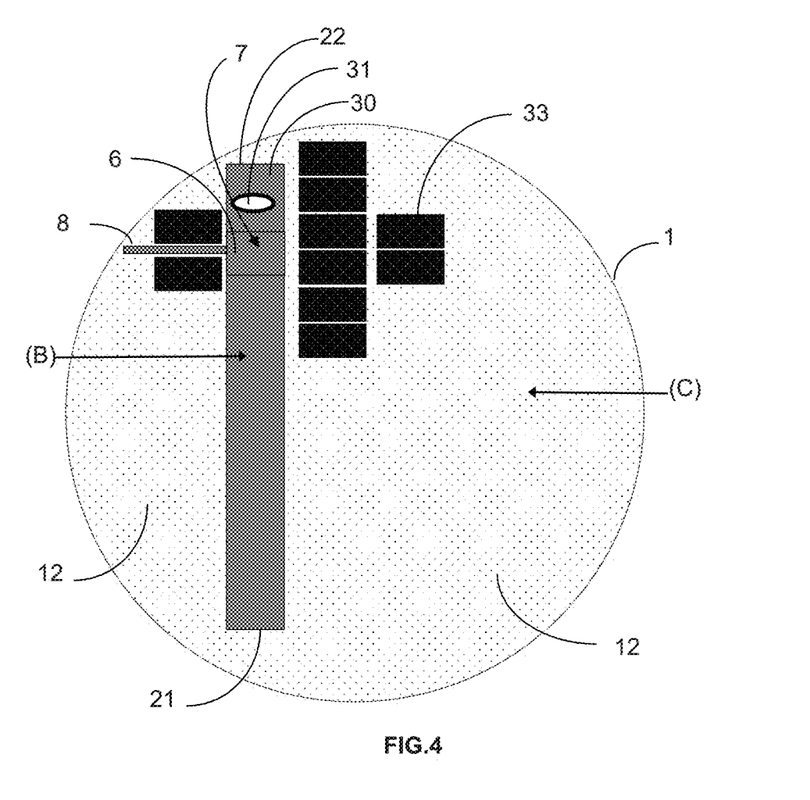
FIG. 4 shows a cross section through the device according to the invention, said device comprising a plurality of horizontal panels 33.
Figure 5:
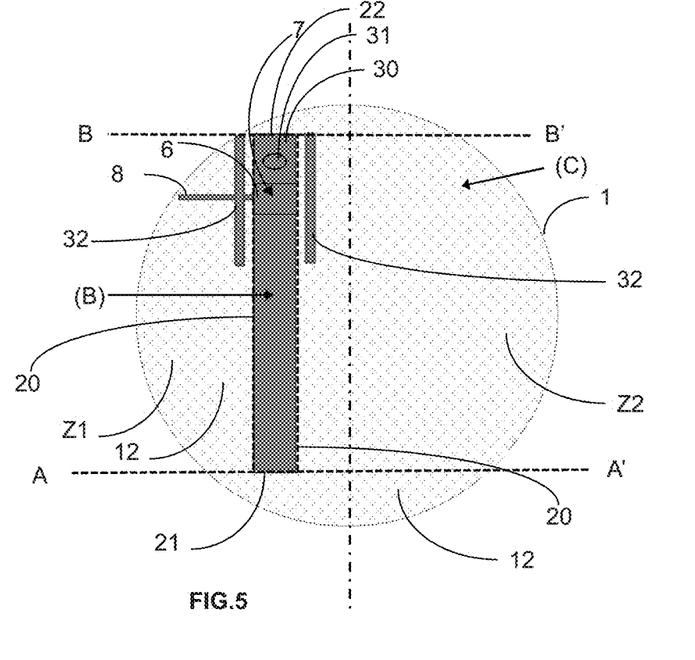
FIG. 5 shows a cross section through the device according to the invention according to one particular embodiment. The mixing zone (B) is off-center with respect to the central axis of the distribution zone (C), thus forming a distribution plate 12 comprising two zones, Z1 and Z2, with different surface areas.

The reaction fluid passing through the catalyst bed 2 is collected by a substantially horizontal collecting means 5 (also referred to here as collecting baffle) leading to the substantially vertical collecting pipe 7, disposed either beneath the collecting zone (A) in a zone referred to as mixing zone (B) (as shown in FIGS. 1, 4 and 5), or in the collecting zone (A) (not shown in the figures). Substantially vertical and substantially horizontal are understood, within the meaning of the present invention, to mean a variation of a plane with the vertical or the horizon, respectively, by an angle β of between ±5 degrees. The collecting means 5 (cf. FIG. 1) is made up of a solid plate disposed in the plane perpendicular to the longitudinal axis of the chamber under the support grating 3 of the catalyst bed 2. The plate of the collecting means 5 extends radially over the entire surface area of the reactor 1. It has, at one of its ends, an opening 6 (cf. FIGS. 4 and 5) to which said collecting pipe 7 is connected. The collecting means 5 makes it possible to collect the flow of reaction fluid coming from the upstream catalyst bed 2 and to direct it toward said collecting pipe 7. The collecting means 5 is spaced apart from the support grating 3 of the catalyst bed 2 by a height H1 (FIG. 1). The height H1 is chosen so as to limit the pressure drop during the collection of the fluid flowing from the catalyst bed 2 and to limit the guard height, i.e. the height formed by the liquid that has accumulated in the collecting means 5. The guard height does not change the drainage of the reaction fluid to the collecting pipe 7, or its flow through this pipe, or its flow through the upper catalyst bed 2. When the collecting pipe 7 and the injection means 8 (FIGS. 4 and 5) are situated at the level of the mixing zone (B), the height H1 is between 10 and 500 mm, preferably between 10 and 200 mm, more preferably between 30 and 150 mm, even more preferably between 40 and 100 mm. Thus, the reaction fluid coming from the bed 2 is forced, in the collecting zone (A), to pass through the collecting pipe 7. When the collecting pipe 7 and the injection means 8 are situated at the level of the collecting zone (A), the height H1 is between 10 and 400 mm, preferably between 30 and 300 mm, and even more preferably between 50 and 250 mm.

Preferably, the collecting pipe 7 and the injection means 8 for the quench fluid are situated in the mixing zone (B), thereby making it possible to increase compactness. The space saved by the compactness of the device can thus be used for the catalyst beds.

Located beneath the collecting zone (A) is a mixing zone (B). With reference to FIGS. 1 to 5, the mixing zone (B) comprises a substantially vertical collecting pipe 7 that is able to receive the reaction fluid collected by the collecting means 5 and the quench fluid coming from the injection means 8 (cf. FIG. 4) opening into said collecting pipe 7.

The mixing zone (B) comprises a mixing chamber 15, of length L1 (cf. FIG. 3), situated downstream of the collecting means in the direction of flow of the fluids. The cross section of the mixing chamber 15 is preferably rectangular. The collecting pipe 7, which is in communication with the mixing chamber 15, may be situated above the mixing chamber 15 or be contained in said mixing chamber 15. Preferably, the collecting pipe 7 is contained in the mixing chamber 15. Similarly, the injection pipe 8 can open out above the mixing chamber 15, at the same level as said chamber, or directly in the interior of said mixing chamber 15 via a device known to a person skilled in the art, for example a perforated tube passing through the mixing zone 15. The quench fluid may be injected in a cocurrent, cross-current, or countercurrent manner with respect to the reaction fluid coming from the collecting zone (A). The mixing zone (B) also comprises a fluid exchange chamber 16, of length L2 (cf. FIG. 3), the exchange chamber 16 being situated downstream of the mixing chamber 15 in the direction of flow of the fluids. The cross section of the exchange chamber 16 is preferably rectangular. According to the invention, the exchange chamber 16 is situated beneath the mixing chamber 15. Preferably, the mixing chamber 15 is superposed on the exchange chamber 16. The fluids pass from the mixing chamber 15 to the exchange chamber 16 via an opening 18 (cf. FIG. 2) situated at the outlet end of the mixing chamber 15 in the direction of flow of the fluids. The configuration of the mixing zone (B) makes it possible for the fluids to be mixed in the mixing chamber 15 and for said mixture to flow to the exchange chamber 16. The reaction fluid and the quench fluid continue to be mixed in the exchange chamber 16.

According to the invention, the length L2 of the exchange chamber 16 is strictly greater than the length L1 of the mixing chamber 15 so as to create a ceiling 30 on said exchange chamber 16, said ceiling 30 comprising at least one opening 31 suitable for the passage of the fluids from said exchange chamber 16 to said distribution zone (C). Said opening 31 can equally be in the form of one or more orifices of any geometry and/or of one or more slots. Such an arrangement of the device according to the invention makes it possible, by creating an opening 31 in the exchange chamber, to better manage the flow rate of the fluids, notably of the gas type, leaving the exchange chamber 16, and thus to limit the impact of the flow rate of the fluids on the distribution plate 12 of the distribution zone (C). Preferably, the ratio between the length L1 of the mixing chamber 15 and the length L2 of the exchange chamber 16 is between 0.1 and 0.9, preferably between 0.3 and 0.9. Advantageously, the percentage of surface area taken up by the opening(s) 31 is between 20 and 100% relative to the total surface area of the ceiling 30, preferably between 30 and 80% of the surface area. In one particular embodiment according to the invention, the percentage of surface area of said opening 31 is equal to 100% of the total surface area of the ceiling 30, meaning that the ceiling 30 is completely open over the distribution zone (C).

Advantageously, the ends of the mixing chamber 15 and exchange chamber 16 are not in contact with the wall of the chamber of the reactor 1, so as to allow the flow of fluids over the distribution plate 12 on either side of the mixing chamber 15 and exchange chamber 16. Advantageously, the mixing chamber 15 and the exchange chamber(s) 16 form one part.

The cumulative total height H2 of said mixing chamber 15 and of said exchange chamber 16 is between 200 and 1500 mm, preferably between 200 and 800 mm, more preferably between 300 and 750 mm, and even more preferably between 350 and 700 mm. Preferably, the width "L" (cf. FIG. 2) of the exchange chamber 16 is between 200 and 1100 mm, preferably between 200 and 800 mm, more preferably between 250 and 700 mm, and even more preferably between 300 and 600 mm.

The ratio of the volumes (in %) between the mixing chamber 15 and the exchange chamber 16 is between 10 and 90%, preferably between 50 and 90%, and even more preferably between 75 and 90%.

In one particular embodiment according to the invention (not shown in the figures), the injection means 8 for the quench fluid as described above may be supplemented by a nozzle that opens directly into the collecting pipe 7, said nozzle consisting of a tube comprising at least one orifice that opens into said collecting pipe 7. Preferably, said nozzle comprises a plurality of orifices distributed uniformly over the entire surface of said tube. The shape of the orifices may be highly variable, generally circular or rectangular, these orifices being preferably distributed uniformly over the entire surface of the nozzle.

Figure 6:
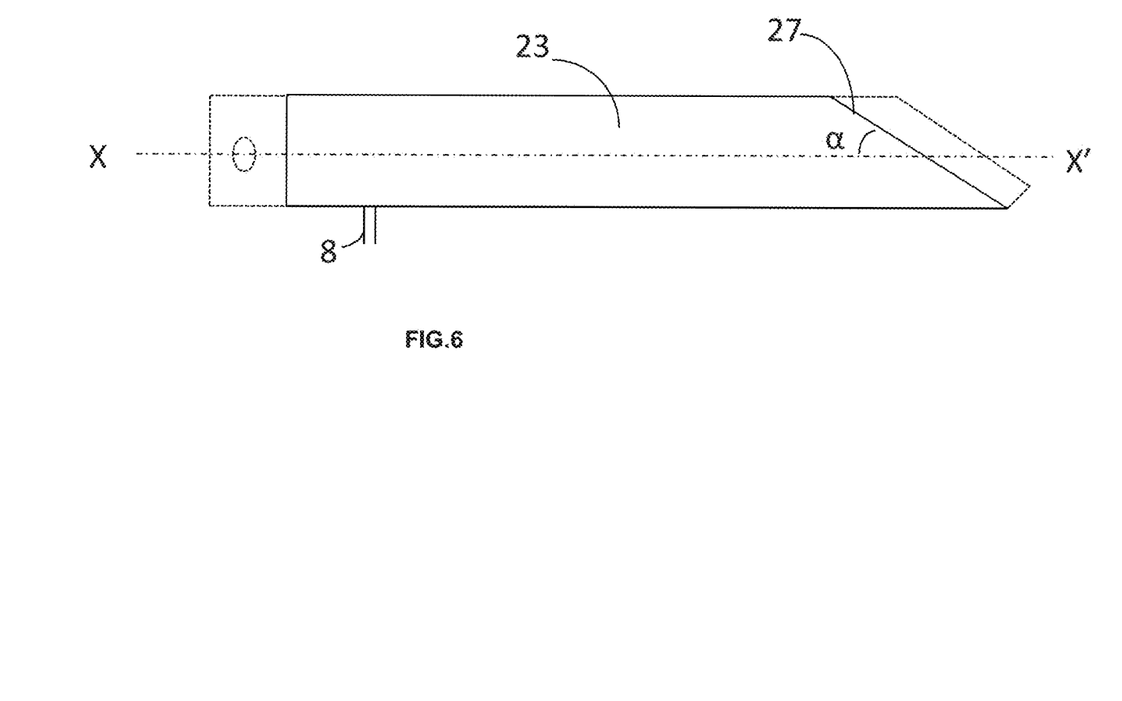
FIG. 6 shows a view in section along the axis (XX') of the mixing zone (B) of one particular embodiment of the device according to the invention.

Advantageously, the bottom 23 of the mixing chamber 15 (cf. FIG. 6) may comprise an end edge 27 that has a beveled shape and forms an angle α of between 20° and 70°, preferably between 30° and 60°, and even more preferably between 30° and 45°, with the longitudinal axis XX' of the mixing chamber 15. Such a shape of the end edge of the mixing chamber 15 makes it possible to create a flow of the fluids of the swirling type at the opening 18, having the effect of improving the effectiveness of mixing of the fluids, notably by allowing mutual mixing of the lines of flow of the fluids that are situated on either side of the lateral walls of the mixing chamber 15. In addition, such a configuration of the mixing chamber 15 has the effect of reducing the speed of the fluids between the mixing chamber and the exchange chamber. As a result of the fluid speeds at the opening 18 being reduced, the pressure drop is minimized.

Located beneath the mixing zone (B) is the distribution zone (C). The distribution zone (C), which extends over a height H3 (cf. FIG. 1), comprises a distribution plate 12 that carries a plurality of chimneys 13, and a plurality of horizontal panels 33 (cf. FIG. 4) that are situated beneath the opening 31 in the ceiling 30 of the exchange chamber 16 but above the chimneys 13 or are positioned on the chimneys 13 of the distribution plate 12. More specifically, the chimneys 13 are opened in their upper part by an upper opening and have, along their lateral wall, a series of lateral orifices intended for the separate passage of the liquid phase (through the orifices) and the gas phase (through the upper opening) inside the chimneys 13, so as to effect the intimate mixing thereof inside said chimneys 13. The shape of the lateral orifices may be highly variable, generally circular or rectangular, these orifices being preferably distributed over each of the chimneys at several substantially identical levels from one chimney to another, generally at least one level, and preferably 1 to 10 levels, so as to allow the establishment of an interface that is as regular (planar) as possible between the gas phase and the liquid phase. Advantageously, the height H3 of the distribution zone is between 20 and 1500 mm, more preferably between 50 and 800 mm, and even more preferably between 100 and 600 mm.

In order to ensure a homogeneous distribution of the fluids over the distribution plate 12, the device comprises a plurality of horizontal panels 33 (cf. FIG. 4) that are situated in the distribution zone (C), beneath the opening 31 in the ceiling 30 of the exchange chamber 16 but above the chimneys 13 or are positioned on the chimneys 13 of the distribution plate 12 (cf. FIG. 1). The presence of the horizontal panels 33 allows pre-distribution of the fluids over the distribution plate 12. Said horizontal panels 33 are preferably spaced apart from one another by a distance of between 1 and 50 mm, preferably between 5 and 20 mm, so as to allow the fluids to flow to the space situated between the horizontal panels 33 and the distribution plate 12. Preferably, said horizontal panels 33 are situated at a height of between 0 and 100 mm from the chimneys 13 of the distribution plate 12. When the horizontal panels are placed on the chimneys of the distribution plate, the latter are configured so as to allow the passage of fluids of the gas type, for example by having a beveled end. Preferably, the surface area of the cross section taken up by said horizontal panels 33 is in the range from 2 to 95% of the surface area of the cross section of the distribution zone (C), and more preferably between 2 and 20%. Such an arrangement of the device according to the invention makes it possible to ensure good effectiveness of mixing of the fluids without otherwise causing an increase in the bulk of said device. In one particular embodiment according to the invention, the horizontal panels 33 comprise a plurality of perforations that allow the fluids to flow to the space situated between the horizontal panels 33 and the distribution plate 12. For each horizontal panel 33, the surface area taken up by said perforations is between 1 and 20% of the surface area, preferably between 2 and 5% of the surface area, relative to the total surface area of the horizontal panel 33.

In one particular embodiment, the exchange chamber 16 may also comprise, on its lateral walls 20, lateral passage sections 17 (cf. FIG. 3) suitable for the passage of the fluids from the mixing zone (B) to the distribution zone (C). In addition, the device may optionally also comprise at least one lateral deflector 32 (cf. FIG. 5) situated in said distribution zone (C) opposite at least one lateral passage section 17. Preferably, the device comprises at least one pair of lateral deflectors 32 that are situated in the distribution zone (C) on either side of the exchange chamber 16 opposite the lateral passage sections 17.

Advantageously, the mixing zone (B), i.e. the mixing chamber 15 and the exchange chamber 16, is off-center with respect to the center of the distribution zone (C) (cf. FIG. 5). This offset of the mixing zone with respect to the center of the distribution zone has the advantage of making operations of inspecting and maintaining the device easier. This particular configuration of the device divides the distribution plate 12 into two zones Z1 and Z2 with different surface areas, where Z1<Z2 (cf. FIG. 5). The zones Z1 and Z2 are defined, respectively, as the surface area of the distribution plate 12 comprised between the lateral wall 20 of the exchange chamber 16, the periphery of the chamber 1 of the reactor, and the two axes AA' and BB' (cf. FIG. 5) passing through the ends 21 and 22 of the exchange chamber 16, respectively (it being understood that Z1<Z2). R is defined as being the relationship between the surface area of the zone Z1 and of the zone Z2 (R=Z1/Z2), it being understood that R is between 0 and 1, not including the values 0 and 1. Thus, when the device according to the invention comprises lateral passage sections 17, and in order to ensure good distribution of the fluids over the two zones Z1 and Z2 of the distribution plate 12, the flow rate of the fluids passing through the lateral passage sections 17 of the exchange chamber 16 has been adapted as a function of the ratio R. Sp is understood to be the total surface area of the lateral passage sections 17 of the lateral wall 20 opposite the zone Z1 of the distribution plate 12 (i.e. located on the side where the surface area of the distribution plate is smallest) and Sg is understood to be the total surface area of the lateral passage sections 17 of the lateral wall 20 opposite the zone Z2 of the distribution plate 12 (i.e. located on the side where the surface area of the distribution plate is greatest). Good distribution of the fluids over the two zones of the distribution plate is obtained if the ratio R' between the surfaces areas Sp/Sg is between 0.5 and 1.5, preferably between 0.6 and 1.4. Specifically, in the absence of particular distribution means at the outlet of the exchange chamber 16, the two zones Z1 and Z2 of the distribution plate 12 are fed by identical fluid flow rates, resulting in poor distribution of the fluids, and thus causing a significant loss in the distribution performance of the fluids over the distribution plate 12. When it comprises lateral passage sections 17 on the walls 20 of the exchange chamber 16, the total surface area of said sections differing depending on whether the side in question is the one on which the distribution surface area is smallest (Z1) or greatest (Z2), the device according to the invention makes it possible generate, at the outlet of the exchange chamber 16, pressure drops that make it possible to alter the fluid flow rates according to the ratio R (R=Z1/Z2).

In one embodiment according to the invention, the exchange chamber 16 is positioned directly on the horizontal panels 33 of the distribution zone (C) (as shown for example in FIG. 1). In another embodiment (not shown in the figures), the exchange chamber 16 is situated at a distance "d" from said horizontal plates 33, preferably between 20 and 150 mm, and more preferably between 30 and 80 mm. The space comprised beneath the exchange chamber 16 and the horizontal panels 33 allows the distribution of the fluids over the entire surface area of said horizontal plates 33. In this embodiment, the exchange chamber 16 may comprise, in its lower part, longitudinal passage sections in order that the mixture of fluids can flow directly onto the horizontal plates 33 situated directly beneath the exchange chamber 16. Of course, the number, shape and size of the longitudinal passage sections are chosen such that a minor fraction of the flow of fluid mixture passes through said longitudinal passage sections. The longitudinal passage sections may be equally in the form of orifices and/or of slots.

Beneath the distribution plate 12, a dispersion system may be positioned so as to distribute the fluids uniformly over the catalyst bed 14 situated downstream of said system. The dispersion system 19 (cf. FIG. 1) may comprise one or more dispersion devices that may be associated with each chimney 13, be shared between several chimneys 13, or be shared between all the chimneys 13 of the distribution plate 12. Each dispersion device 19 has a substantially flat and horizontal geometry, but may have a perimeter of any shape. Furthermore, each dispersion device 19 may be situated at different heights. Advantageously, said dispersion device is in the form of gratings, and/or may optionally comprise deflectors. Advantageously, the axis of the grating(s) 19 is preferably perpendicular to the longitudinal axis of the chamber of the reactor in order to improve the distribution of the mixture of fluids over the entire radial cross section of the chamber of the reactor. The distance between the dispersion system of the bed of solid granules that is situated immediately beneath is chosen so as to preserve the mixed state of the gaseous and liquid phases as far as possible as it is at the outlet of the chimneys 13.

Preferably, the distance between the distribution plate 12 and the catalyst bed 14 situated beneath said distribution plate is between 50 and 400 mm, preferably between 100 and 300 mm. The distance between the distribution plate 12 and said dispersion device 19 is between 0 and 400 mm, preferably between 0 and 300 mm. In one particular embodiment, the distribution plate 12 is positioned on the dispersion device 19.

Compared with the devices described in the prior art, and even more particularly compared with the device disclosed in the document FR 2 824 495, the mixing and distribution device according to the invention has the following advantages:

good thermal efficiency and good effectiveness of mixing of the fluids;

good distribution of the fluids over the distribution plate 12, on account of the presence of an opening 31 in the exchange box 16 and of a plurality of horizontal panels 33 situated above the opening 31 in the exchange box 16, and above the chimneys 13 or on the chimneys 13 of the distribution plate 12;

when the mixing zone (B) is off-center with respect to the central axis of the distribution zone (C), it is much easier to carry out the operations of loading and/or unloading the catalyst situated beneath and/or above the device since it is no longer necessary to disassemble said device;

the device according to the invention significantly increases compactness:
when the exchange chamber is placed directly on the distribution panels 33, which are themselves placed directly on the chimneys 13 of the distribution plate 12; and/or
when the collecting pipe 7 and the injection means 8 are situated in the mixing zone (B).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding application No. FR 1851949, filed Mar. 7, 2018 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Device for mixing and distributing fluids for a down-flow catalytic reactor, said device comprising:
   at least one collecting zone (A) comprising at least one collecting means (5);
   at least one substantially vertical collecting pipe (7) that is able to receive a reaction fluid collected by said collecting means (5) and at least one injection means (8) opening into said collecting pipe (7) in order to inject a quench fluid;
   at least one mixing zone (B), situated downstream of said collecting pipe (7) in the direction of flow of the fluids, said mixing zone (B) comprising at least one fluid mixing chamber (15) of length L1, said mixing zone (15) comprising a first end in communication with said collecting pipe (7) and a second end in communication with a fluid exchange chamber (16) of length L2, situated beneath said mixing chamber (15), the length L2 of said exchange chamber (16) being strictly greater than the length L1 of said mixing chamber (15) so as to create a ceiling (30) on said exchange chamber (16), said ceiling (30) comprising at least one opening (31) that allows the fluids to pass from said exchange chamber (16) to a distribution zone (C);
   at least one distribution zone (C), situated beneath the mixing zone (B), downstream of said mixing zone (B) in the direction of flow of the fluids, said distribution zone (C) comprising a distribution plate (12) that carries a plurality of chimneys (13) and a plurality of horizontal panels (33), situated beneath the opening (31) in the ceiling (30) of the exchange chamber (16) but above the chimneys (13) or on the chimneys (13) of the distribution plate (12) of the distribution zone (C).

2. Device according to claim 1, characterized in that the ratio between the length L1 of the mixing chamber (15) and the length L2 of the exchange chamber (16) is between 0.1 and 0.9.

3. Device according to claim 1, characterized in that the percentage of surface area taken up by the opening(s) (31) is between 20 and 100% relative to the total surface area of the ceiling (30).

4. Device according to claim 3, characterized in that the percentage of surface area taken up by the opening(s) (31) is equal to 100% of the total surface area of the ceiling (30).

5. Device according to claim 1, characterized in that said horizontal panels (33) are situated at a height of at most 100 mm above the chimneys (13) of the distribution plate (12).

6. Device according to claim 1, characterized in that said horizontal panels (33) are situated on the chimneys (13) of the distribution plate (12).

7. Device according to claim 1, characterized in that the surface area of the cross section taken up by said horizontal panels (33) is in the range from 2 to 95% of the surface area of the cross section of the distribution zone (C).

8. Device according to claim 1, characterized in that said horizontal panels (33) are spaced apart from one another by a distance of between 1 and 50 mm.

9. Device according to claim 1, characterized in that said mixing zone (B) is off-center with respect to the central axis of the distribution zone (C), forming two zones (Z1) and (Z2) on the distribution plate (12), the ratio R of which defined as the relationship between the surface area of the zone (Z1) and the zone (Z2) is between 0 and 1, not including the values 0 and 1.

10. Device according to claim 1, characterized in that the mixing chamber (15) comprises a bottom (23) having an end edge (27) that has a beveled shape and forms an angle α of between 20° and 70° with the longitudinal axis XX' of the mixing chamber (15).

11. Device according to claim 1, characterized in that the injection means (8) is supplemented by a nozzle that opens directly into said collecting pipe (7), said nozzle consisting of a tube comprising at least one orifice that opens into said collecting pipe (7).

12. Device according to claim 1, characterized in that said exchange chamber (16) also comprises, on its lateral walls (20), a plurality of lateral passage sections (17) suitable for the passage of the fluids from said exchange chamber (16) to said distribution zone (C).

13. Device according to claim 12, characterized in that it also comprises at least one lateral deflector (32) situated in said distribution zone (C) opposite at least one lateral passage section (17).

14. Device according to claim 1, characterized in that the volume ratio between said mixing chamber (15) and said exchange chamber (16) is between 5 and 60%.

15. Downflow catalytic reactor having a chamber (1) containing at least two fixed catalyst beds (2, 14) separated by an intermediate zone having a device for mixing and distributing fluids according to claim 1.

* * * * *